United States Patent [19]
Booher

[11] 3,892,053
[45] July 1, 1975

[54] PROGRAMMABLE PSYCHOMOTOR TASK SIMULATOR SYSTEM

[75] Inventor: Harold R. Booher, Garrett Park, Md.

[73] Assignee: The United States of America as represented by the Secretary of the Navy, Washington, D.C.

[22] Filed: Jan. 24, 1974

[21] Appl. No.: 436,227

[52] U.S. Cl. ............................................. 35/22 R
[51] Int. Cl.² .................................... G09B 19/00
[58] Field of Search ............ 35/10, 13, 19 R, 19 A, 35/22 R, 1, 8 R

[56] References Cited
UNITED STATES PATENTS

| | | | |
|---|---|---|---|
| 3,061,945 | 11/1962 | Hawkins | 35/13 |
| 3,146,533 | 9/1964 | Carmody et al. | 35/10 |
| 3,310,883 | 3/1967 | Young | 35/10 |
| 3,456,363 | 7/1969 | Boxley | 35/13 |
| 3,604,128 | 9/1971 | Homann | 35/13 |

*Primary Examiner*—Wm. H. Grieb
*Attorney, Agent, or Firm*—R. S. Sciascia; P. Schneider; W. T. Ellis

[57] ABSTRACT

An apparatus to measure comprehension using different instruction presentation techniques comprising a programmable diode matrix, a shift register and ring counter to shift from one task to the next in the diode matrix, experimenter and subject controls to make responses and to advance to the next programmed task in the matrix, an event recorder to record the response of the subject and the time of his response, and a display connected to and energized by the diode matrix. The display includes an array of lights, dials, meters, a tape recorder, and an oscilloscope. The subject perceives his instructions and then responds accordingly on the apparatus.

7 Claims, 8 Drawing Figures

I. REFER TO TABLE I ON PAGE 5 FOR SCOPE SIGNAL WAVE-SHAPE AND VALUES FOR TEST POINT 3. SET SCOPE CONTROL PUSHBUTTON SWITCH ON DISPLAY-MONITOR PANEL TO ON AND COMPARE TABLE SIGNAL CHARACTERISTICS WITH SCOPE SIGNAL. RELEASE SCOPE CONTROL PUSHBUTTON SWITCH TO OFF AND VERIFY IF CORRECT SIGNAL IS PRESENT.

III.

REFER TO P-9 FOR TEST POINT 3 SCOPE SIGNAL.

SET SC SWITCH ON. COMPARE SCOPE SIGNAL WITH TABLE SIGNAL

⇨ VERIFY CORRECT SIGNAL PRESENT

*FIG. 7.*

IV. REFER TO TABLE I ON PAGE 5 FOR SCOPE SIGNAL WAVE-SHAPE AND VALUES FOR TEST POINT 3. SET SCOPE CONTROL PUSHBUTTON SWITCH ON DISPLAY-MONITOR PANEL TO ON AND COMPARE TABLE SIGNAL CHARACTERISTICS WITH SCOPE SIGNAL. RELEASE SCOPE CONTROL PUSHBUTTON SWITCH TO OFF AND VERIFY IF CORRECT SIGNAL IS PRESENT.

*FIG. 8.*

PROGRAMMABLE PSYCHOMOTOR TASK SIMULATOR SYSTEM

BACKGROUND OF THE INVENTION

A. Field of Invention

The present invention relates generally to test and research equipment and in particular to an apparatus and method for providing instruction-comprehension research data.

B. Description of Prior Art

Information presentation methods appear in many varied forms. Examples of such presentations are road signs, operator instructions for dialing long distance telephone calls, restaurant menu instructions, TV dinner instructions, bicycle assembly instructions, and antidotes for the drinking of various household poisons. All of these tasks can be performed with relative ease provided the instructions are properly comprehended. If a mistake is made, the instruction may be comprehended the second time, but the making of mistakes is a costly learning process. The designer/writer of instructions all too frequently fails to communicate his message to the human receiver.

Decisions concerning what method of presentation is to be used are generally made with the best intentions, but too often erroneously. For example, attempts have frequently been made to enhance learning of maintenance or operator instructions by the use of comic characters or a sexy female. Research findings suggest that the writer may achieve just the opposite effect. Embellishments like a female voice or a comic character are good for calling attention but do more to distract than to aid in the learning of any work task.

Thus the primary question to be answered is what is the relative effectiveness of a particular presentation technique in explaining a particular task. For example, what kind of tasks does a cold coding format enhance? When should depiction of motion be included in the presentation? Do comic characters and the use of the audio channel add or detract from a maintenance man's understanding of repair instructions? What is the proper mix of pictures to words in aiding comprehension?

There is very little research data on the effectiveness of such presentation techniques. There are a number of reasons for this. It is very difficult to assess the relative value of new presentation concepts to user performance because of the interaction with other factors such, as the information content, the type of task, and the subjects aptitude. Also, it is almost impossible to generalize about instructional methods. Thus a format which aids an inexperienced electronics technician may hinder an experienced automobile mechanic. Obviously any research done must be restricted to a specific task.

Another reason for so few studies on the subject is that it is very difficult to measure the comprehension of simple instructions. Measurement techniques developed in readability studies, or written tests for comprehension have not proved particularly reliable or valid in determining comprehension of instructions. When the research concerns the communication with pictures, verbal tests appear even less satisfactory.

A number of studies were performed to obtain data on instruction comprehension. The basic research technique consists of the following steps:

1. Selecting or developing an apparatus which allows personnel to carry out psychomotor tasks similar to tasks which are normally conducted in response to instructions.

2. Designing a range of psychomotor tasks to be carried out on the apparatus.

3. Writing procedural instructions for the tasks designed. These become the content of the instruction.

4. Developing instructions in different presentation formats to present the same instruction content.

5. Programming the apparatus to always present the same control — display problem situations to each test subject — and to advance from problem to problem.

6. Comparing different presentation methods in terms of both time and errors required by test subject to follow instructions presented by different formats.

This technique is not unfamiliar to human factors specialists. It is a procedure of investigation that permits a comparison of items with some confidence that the findings are generalizable beyond the test situation. The use of task performance measurements however, to reflect comprehension of instructions is unusual in reading research, even though a performance measurement approach lends itself quite well to studies in procedural instructions.

The design of a programmable apparatus with a large variety of simulated functionally related operations gives the subject a sense of reality while at the same time permitting a study of behaviors in a controlled, organized manner. Just selecting a machine and testing a subject on specific operations inherent in the machine limits the findings to that type of machine. The other extreme of total random appearance of control-display elements on a grid makes too many nonsense relationships between controls - displays, thereby losing the "reality" which is important in human factors research.

The simulator apparatus designed to allow subjects to carry out psychomotor tasks is the subject of the present invention.

SUMMARY OF THE INVENTION

Briefly, the present invention provides a tool to determine the relative effectiveness of different presentation techniques. The apparatus comprises an array of operator-maintainer controls and displays arranged to give the subject a sense of reality such that the setting is readily generalizable to actual man - machine interface situations, a logic circuit capable of being programmed to allow a series of tasks to be run consecutively on the machine, test-subject decision controls, experimenter controls including a task-advancing control, and an event recorder.

OBJECTS OF THE INVENTION

An object of the present invention is to allow the testing of different presentation techniques to determine their relative effectiveness.

A further object is to allow the programming of a plurality of tests that can be run consecutively and automatically.

A still further object is to allow the recording of each response by the subject and the time of this response automatically.

A further object is to allow the controlled advance to each new task in a sequence of programmed tasks.

Other objects, advantages and novel features of the present invention will become apparent from the following detailed description of the invention when con-

3 sidered in conjunction with the accompanying drawings.

DETAILED DESCRIPTION OF THE PREFERRED EMBODIMENT

Figure 1:
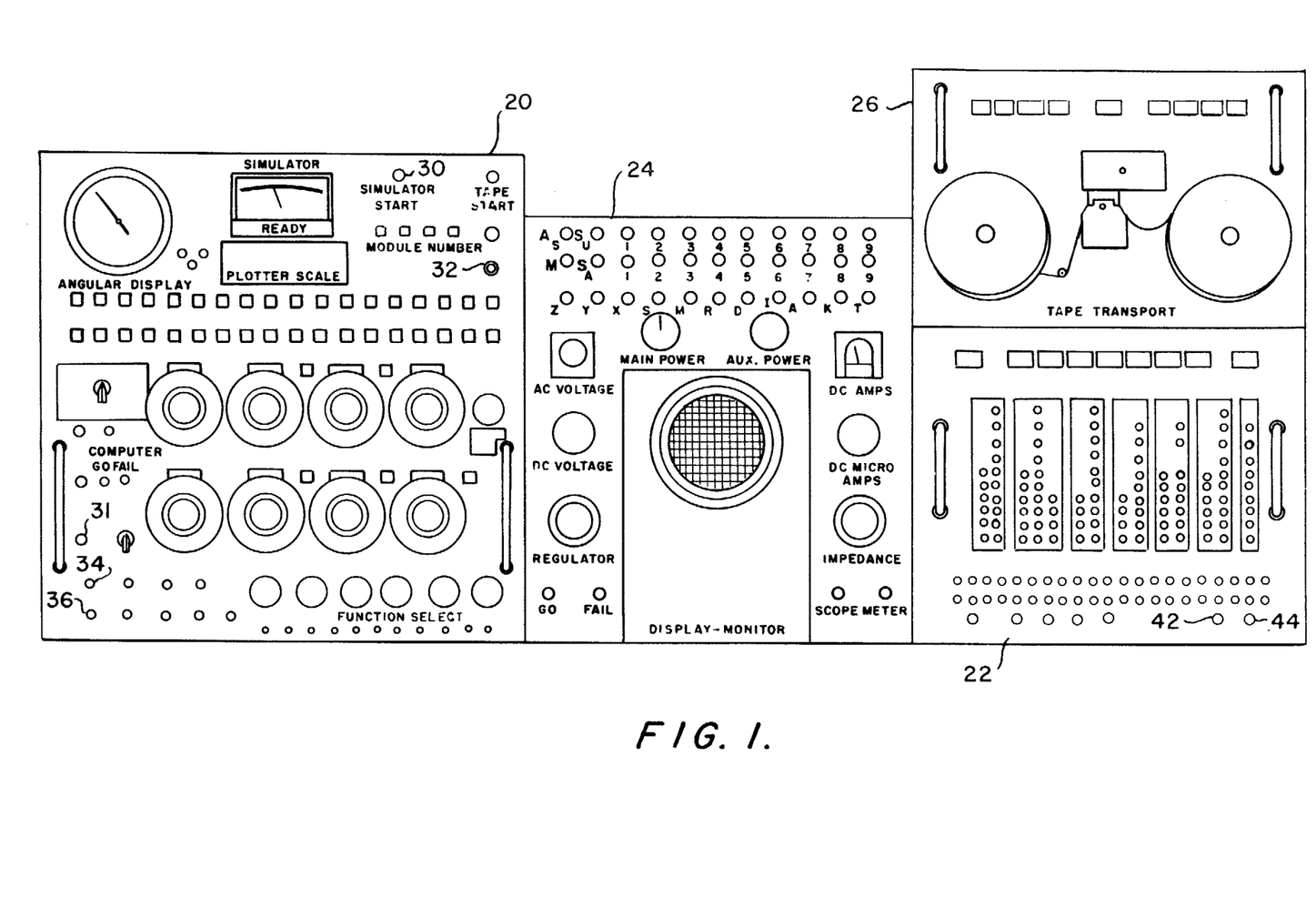
FIG. 1 illustrates the psychomotor control display panels of the present invention.

FIG. 1 shows the four panels making up the control display portion of the simulator. For purposes of description these sections are named System Simulator Panel 20, Analyzer Panel 22, Display Monitor Panel 24, and Tape Transport Panel 26. The Display - Monitor Panel and all labeling on the panels are specially designed for the simulator apparatus. The Control - Display panels provide a wide variety of man-machine operations, samples of the most common types of displays and controls, and appear in varying degrees of complexity. The panels attempt to give the appearance of "reality" to provide a setting which is more readily generalizable to actual situations where man-machine interfaces can be expected to occur.

One aspect which was found to be very important to the feeling of reality was a GO-FAIL display reaction whenever the subject made a decision response. A red light to indicate a system failure and a green light to indicate that the system was operating correctly gave the operator a feeling that he was controlling the operation of the machine. This feature was present even when an operator was told that he had no control over the appearance of the Red or Green light. Subjects apparently were either unable or unwilling to remove themselves from the feeling that their response dictated the machines reaction.

More specifically, Table I illustrates the variety of displays and controls appearing on the panels.

Several lamps on the simulator panel and the lamps, meters, and oscilloscope signals on the display monitor panel are programmable electronically. By pressing a switch, i.e., either the GO or FAIL button on a student control box or the GO button on an observer remote control box, a programmed array of elements are activated. Depending on the program chosen, this may be any combination of lamps and meters as well as a particular wave form on the oscilloscope face. By repeating the closure of either the GO or FAIL button, successive arrays are energized provided an ENABLE button under experimenter control has been pressed between each GO or FAIL command.

In addition to the programmed circuits, a number of operator manually controlled devices are available. These are certain lamps on the simulator panel, tape transport and the analyzer which are controlled by separate pushbutton and toggle switches on the panels.

The analyzer unit 22 has 14 columns of pushbutton switches ranging from three to 10 buttons per column. The unit has 102 switches coded so that only 18 channels in a recorder are required to distinguish any particular pushbutton address. Each pushbutton connects with three of the 18 channels. One line indicates an Area A, B, C. A second lead determines the column within the area and a third lead determines the pushbutton within a column. The analyzer unit pushbuttons stay on until another button of that column is pressed.

Below the columns of pushbuttons on the analyzer face is a row of recepticles which can be used to check and isolate faults in the 18 channels.

The simulator unit 20 has a plurality of dials, lamps, and switches. Among these are the computer GO and FAIL lamps, and the computer ON/OFF switch 31. A simulator START lamp 30 is provided to enable a toggle switch 32 labeled START. The POWER ON lamp 34 is activated by a toggle switch 36 below the lamp on the Simulator Panel. The TAPE START lamp is activated by the START pushbutton/lamp switch 40 on the Tape Transport. The ANALYZER START lamp 42 is controlled by the START switch 44 on the lower right hand side of the ANALYZER panel. Most of the pushbutton/lamp switches on the simulator illuminate when depressed and extinguish when depressed a second time.

Figure 2:
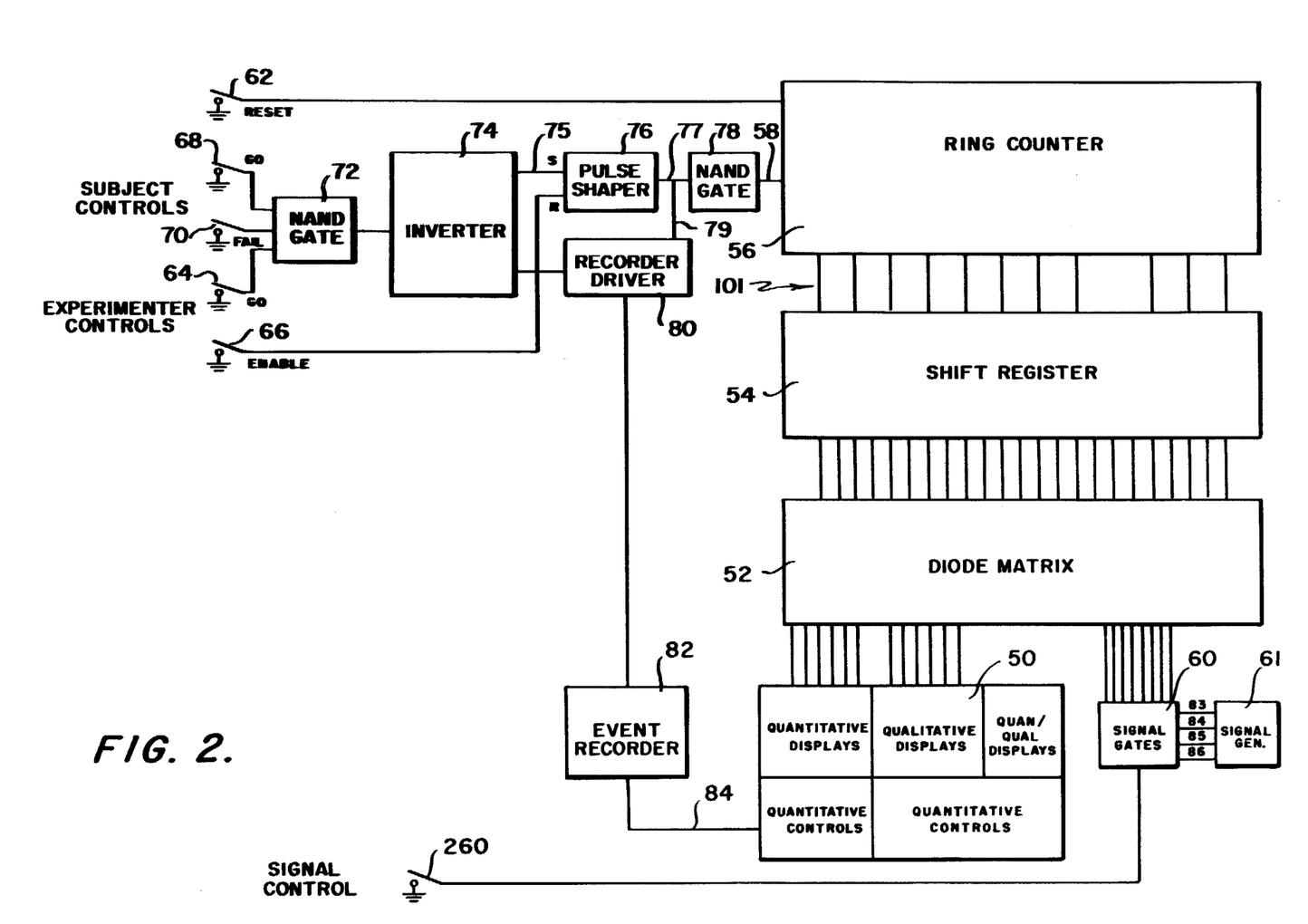
FIG. 2 is a block diagram of one embodiment of the present invention.

FIG. 2 illustrates the basic system. The qualitative and quantitative displays 50 represent the outside display panels of FIG. 1.

It is desirable to have a plurality of tasks for the test subject to consecutively perform. For each task a different combination of displays must be activated. The combination of the ring counter 56, the shift register 54, and the diode matrix 52 is used to implement this feature.

Figure 3:
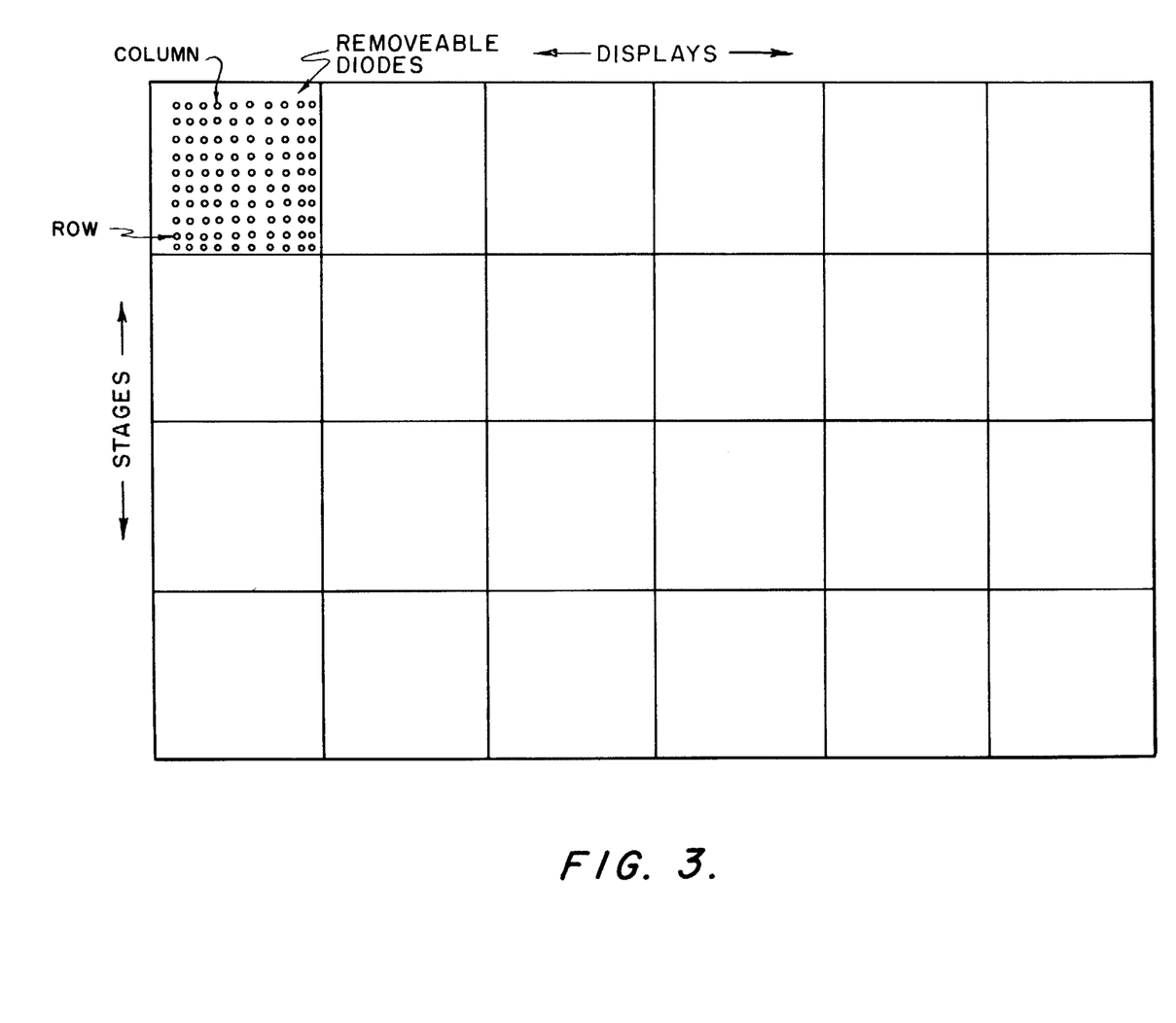
FIG. 3 is a diode matrix that could be used in the present invention.

FIG. 3 shows the diode matrix 52 in more detail. The matrix consists of an array of 10 × 10 diode boards. In this particular embodiment there are 4 rows and 6 columns of 10 × 10 boards. Thus there are 40 diode rows and 60 diode columns giving 2400 diode positions. Each of the 40 rows of the matrix represents one task stage of operation. Each diode in the row of 60 diodes is connected to a different one of the displays. The matrix column and its associated display are shown in Table II. The matrix numbering starts at the upper right hand corner of the control board with row one, column one, and ends at the lower left corner at row 40, column 60. Thus the lamps/meters and scope signals on the task simulator panels are controlled by the columns on the matrix as shown in Table II. For example if the lamps 1, 3, 5 and 8 are desired to light up for the third and fifth task stages in a sequence of task tests, diodes would be placed in columns 8, 6, 4 and 1 of rows 3 and 5.

The shift register 54 consists of a set of 40 flipflops. The ring counter 56 is a 40 bit ring counter. Each of the 40 flipflops in the shift register 54 provides the connection between one counting stage of the ring counter 56 and one of the 40 rows of diodes in the diode matrix 52.

In operation, each time a pulse is applied to the ring counter 56 on line 58, it advances the ring counter 56 to the next stage. This stage applies an output signal to its respective flipflop in the shift register 54 on lines 101. This output signal places the flipflop in a set condition thus energizing the diode row in the diode matrix 52 connected to that flipflop.

Depending on where a diode or diodes are inserted in the row of 60 diodes, a connection will be made between those shift register flipflops and those displays in display 50.

The experiment may be conducted as follows. Prior to the test, the experimenter preselects a variety of displays (Quantitative, Qualitative, or Quantitative/Qualitative) which are to be energized for a particular task stage by inserting diodes at the addresses of those displays for that task stage in the diode plugboard matrix 52.

After displays are assigned for each problem stage, the experimenter closes the RESET switch 62 which places the ring counter 56 and the shift register 54 in a ready state for the first stage. Both the subject and the experimenter have stage advance controls. The GO switch 64 of the experimenter and the GO switch 68 and the FAIL switch 70 of the subject will advance the ring counter 56 and thus the shift register 54 to the next stage. When either of these three controls is closed, a signal is sent through the NAND gate 72. This signal is inverted by the inverter 74 and the sent to the pulse shaper 76. The pulse shaper 76 provides an output pulse to the NAND gate 78 which then applies a pulse to advance the ring counter 56. The inverter 74 also applies a pulse to the Recorder Driver 80. The Recorder Driver 80 acts to mark the event and time of the event on the event recorder 82. The event recorder 82 may merely be a tape recorder. The event recorder 82 and recorder driver 80 are of course optional features that are used in an automatic mode. The event and time of event could be recorded manually by the experimenter.

The pulse shaper 76 only provides an output signal if it is originally in a set condition when it receives a signal from the inverter 74. Thus prior to the advance to the next stage the experimenter must depress the enable switch 66. This places the pulse shaper 76 in set. The purpose of this switch is to prevent the subject from moving more than one stage at a time should he accidently depress his controls more than once.

Display 50 contains a wide variety of displays. The Quantitative/Qualitative display is an oscilloscope which is used to display waveforms varying in shape and size. The signal generator 61 produces a number of different waveforms and applies them on lines 83–86 to the signal gate 60. One of these waveforms will appear on the oscilloscope if a task stage has been reached which connects a signal gate through a diode in the matrix 52 to the shift register 54. The quantitative display consists of the meters on the display panel 50. The qualitative display consists of the lamps on the display panel 50.

The line 84 connecting the display 50 to the event recorder 82 actually represents a plurality of leads, one from each of the displays with a manual dial or button. Thus each time the subject pushes any of the buttons or turns any of the dials it is recorded on one of the channels of the 60 channel event recorder 82. The buttons and dials on the panel each act merely to complete an electrical circuit to the event recorder 82 when they are pushed or turned.

REMOTE CONTROL BOXES

Two remote control boxes house the subject and experimenter switches used to advance the stages of operation from one to forty. The observer has a remote control box with three buttons. They are RESET, ENABLE and GO. The subject has a box with a GO and FAIL button. To start the test sequence the observer first presses the RESET, sending the system to stage one and then the ENABLE button which allows the units to start whenever the subject presses his GO or FAIL button. Once the subject presses a button for his decision, no further effect will occur by the subject pushing either GO or FAIL until the observer has pressed his ENABLE circuit button.

LOGIC CIRCUITRY

Figure 4:
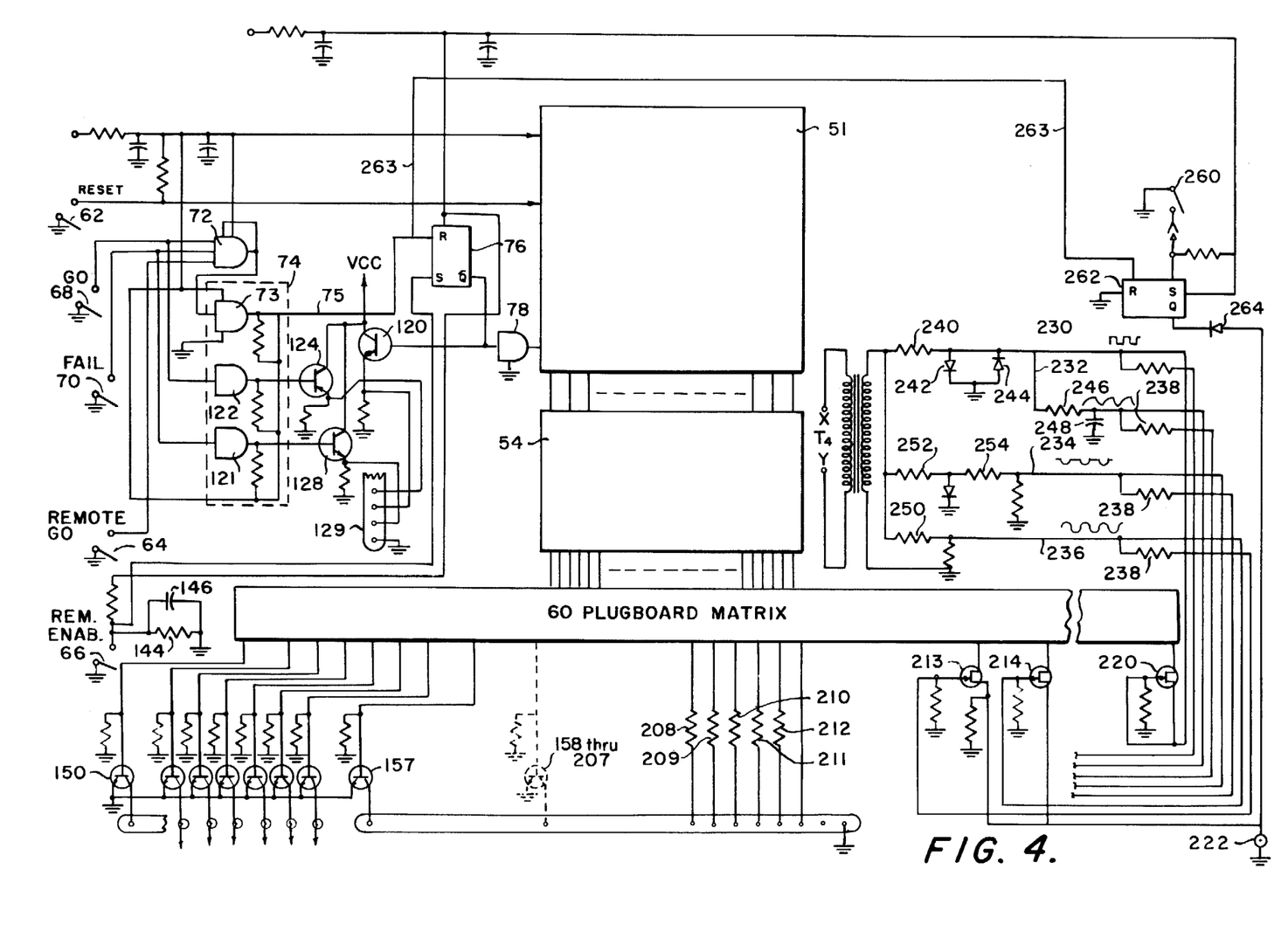
FIG. 4 is a detailed schematic diagram of the embodiment of FIG. 3.

FIG. 4 provides a detailed circuit diagram of the controls and logic for the displays. The REMOTE GO 64, REMOTE ENABLE 66 and RESET 62 switches are controlled by an observer and located in a box separate from the controls of the subject being tested. The GO switch 68 and FAIL switch 70 are control switches operable by the test subject. When a subject wishes to advance to a new stage of control-display operations, he may depress either the GO or FAIL switch. In the general test situation, two switches are provided to allow the subject a decision choice GO or FAIL to a problem just completed. If conditions on the test apparatus match test instruction, he presses GO to indicate that the conditions are satisfactory but he alternatively may press FAIL if conditions are not satisfactory. Depression of either GO or FAIL sends a signal through the NAND gate 72 which passes a signal to inverter gate 73 in the inverter 74. The inverted output pulse of GATE 73 provides a signal to the R input of flipflop circuit 76. If flipflop 76 has been placed in set condition by REMOTE ENABLE 66, an output pulse appears at 0 as a gating signal to the GATE 78 on line 79. Flipflop 76 must receive a pulse at its set input from enable 76 before a signal at the reset input from inverter 74 will cause a new output on line 77.

The output signal from flipflop 76 also serves to start a recorder driver circuit 80 with a pulse to the base of the transistor 120. Separate recorder indications for the GO and FAIL switch closures are obtained through the separate gating circuits, the NAND gate 122 and transistor 124, for the GO switch 68 and the NAND gate 126 and transistor 128 for the FAIL switch 70. The recorder indication signals for each stage advance signal appear at the recorder 82 terminals upon the conduction of the transistor 120. Transient suppression from switch closure noise signals at the remote ENABLE switch are provided by a filter network consisting of the resistor 144 and the capacitor 146.

As stated above, the output signal from the flipflop 76 opens the NAND gate 78 thus providing an advance signal to the input of a 40-bit ring counter 56.

When each stage of the counter is activated it generates and applies a signal to its respective flipflop in the shift-register 54. Thus when this flipflop goes to a set condition, power is connected to any of the displays whose circuits have been completed by the insertion of diodes in those positions in the row of the diode matrix corresponding to the displays.

The columns of the diode matrix 52 are connected to PNP transistor gates 150 through 207 and to FET gates 213 through 220 and resistors 208 through 212. The PNP transistor gates 150 through 207 are connected to panel lamps. The resistors 208 through 212 are connected to meter circuits on the Display Monitor panel.

The FET gates 213 through 220 provide gating for the scope signals.

In its present embodiment the system is capable of producing any one of eight possible waveforms at the scope connection 222. The basic waveforms used are the sine, half sine, sawtooth, and squarewave as shown by the figures above lines 230, 232, 234, and 236. The signal from each of these lines is split into two lines, one of which contains a resistor 238 to reduce each of these waves to a fraction of its original amplitude. The square-wave forming circuitry consists of the resistor 240 and the two rectifier diodes 242 and 244.

The resistor 246 and the capacitor 248 in line 232 provide an integration circuit which transforms the square wave to a sawtooth wave. A sine wave is produced across resistor 250 on line 236. A half-sine wave is produced by the resistors 252, 254, and 256 and the rectifier diode 258 on line 234.

It is to be understood that any waveform or means of producing said waveform could be used here.

The particular wave-shape which appears on the oscilloscope depends on which FET is gated on. If, for example, a plugboard diode connects the FET 213 to its respective flip-flop in the shift register 54, a fractional amplitude sine wave appears at the scope connection 222 when that particular stage is reached.

A wave-shape cannot appear on the scope face until the scope is unblanked. The switch 260 when closed will unblank the scope by supplying a signal to the set input of the flipflop 262. Provided the stage advance signal from the NAND gate 73 has been received at the reset input to the flipflop the flipflop will apply a signal at its Q output. The Q output from flipflop 262 then overcomes the bias of the diode 264 thus allowing any waveform signal selected in the program to appear at the scope input 222.

This apparatus can be used to gather research on a multitude of diverse tasks. Examples of such tasks are (1) the location of and the interaction with objects on a control-display panel; (2) the comparison of table data with control-display conditions and actions with objects on the control-display panel; and (3) the recognition of a symptom on the control-display panel by matching the symptom on the panel to a list of symptoms and taking an action to obtain a certain display response on the control-display panel. Tasks which involve long-term memory could be written and performance measures taken at different intervals after the reading of the instruction.

An example of the types of experiments that can be run on the simulator task apparatus is the following. This test involves the comparison of data from a table with control-display conditions on the panel. The purpose of the test is to determine the proper mix of pictorials-graphics to words to convey a message. In order to determine the best format combinations of words and pictures several instructional formats were developed using various mixes of words to pictures. FIGS. 5-8 illustrate the type of formats that can be developed. The format that each figure represents is discussed below.

Figure 5:
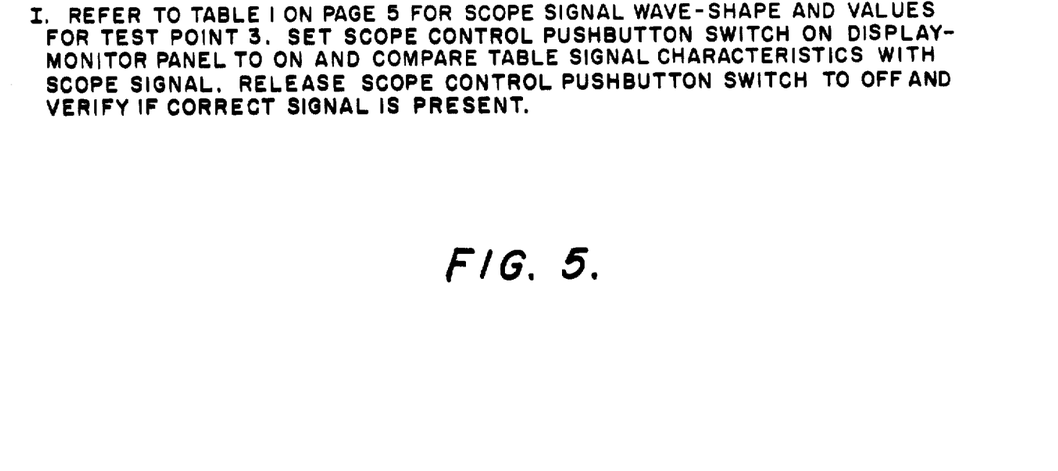
FIG. 5 is an example of an all-verbal instruction format.

I. PRINTED WORDS — Single channel information presentation using printed words and numbers only.

Figure 6:
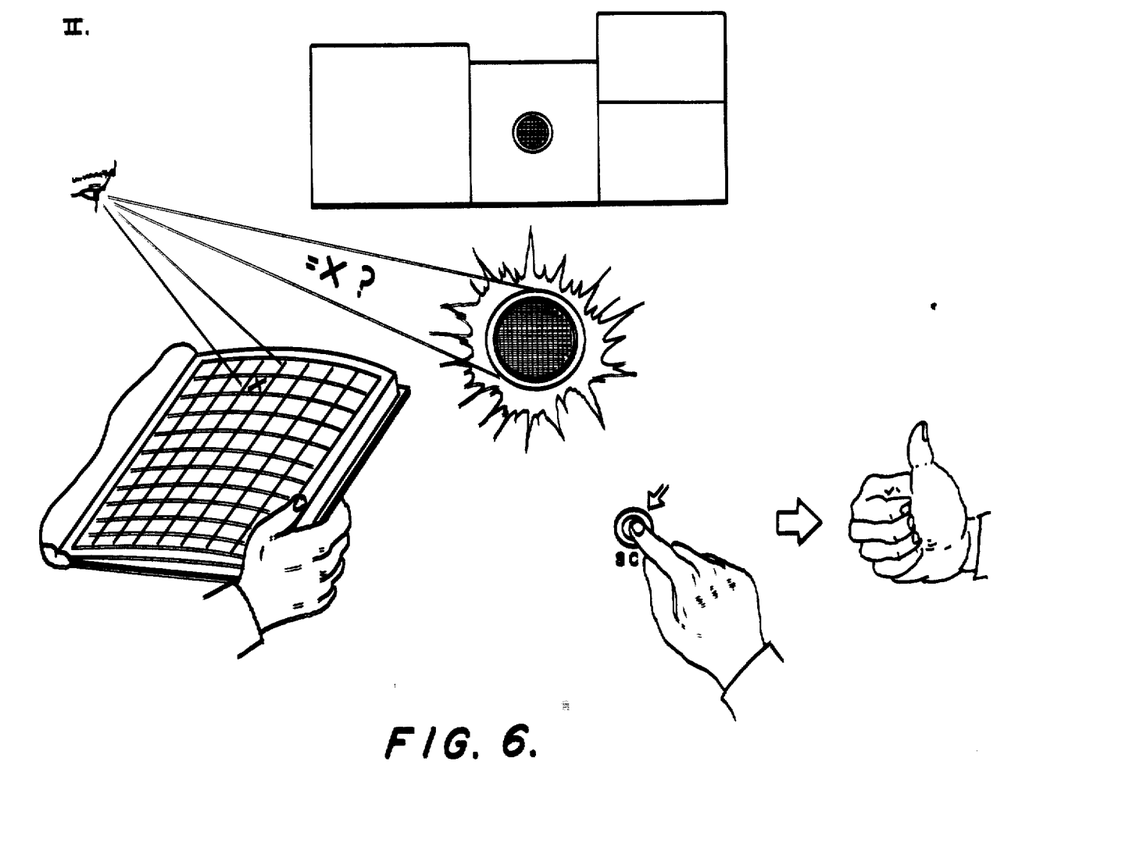
FIG. 6 is an example of an all-pictorial instruction format.

II. PICTORIAL — Single channel information presentation using pictorial-symbolic illustrations only. Even names on the apparatus were replaced with alphanumeric symbols.

Figure 7:
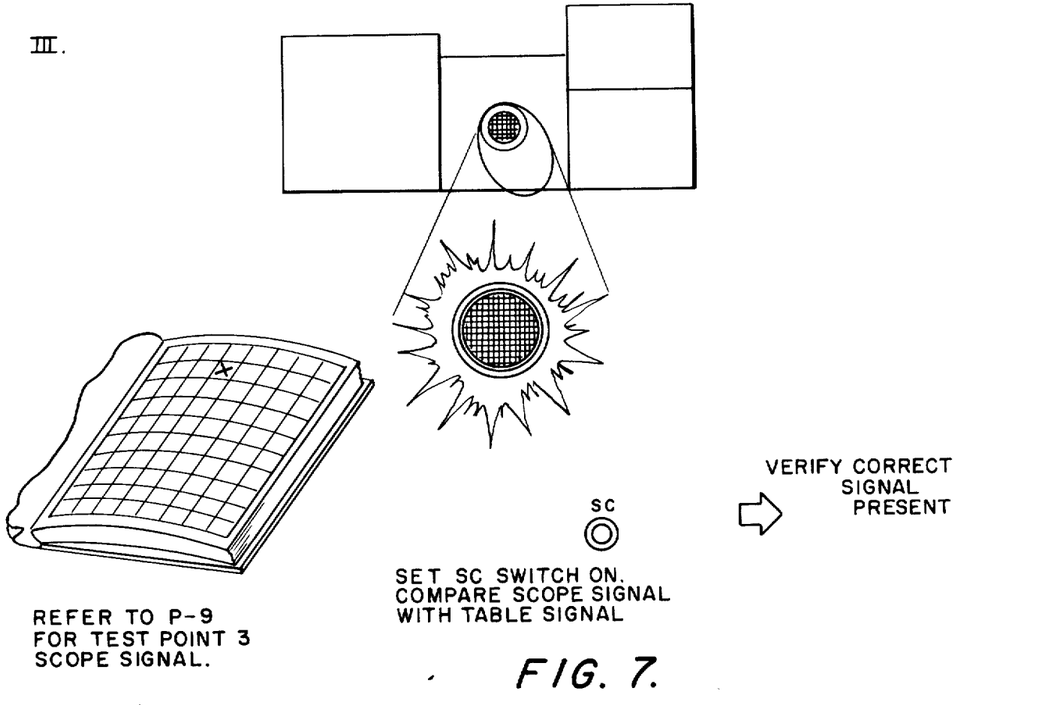
FIG. 7 is an example of a highly pictorial - related verbal instruction format.

III. HIGHLY PICTORIAL-RELATED VERBAL — This group received primarily pictorial mode of presentation. The group has a pictorial view of general context, and focus information for each step of each instruction, but short verbal statements for each action were also required. As in Group II, names on the apparatus were replaced with alphanumeric symbols.

Figure 8:
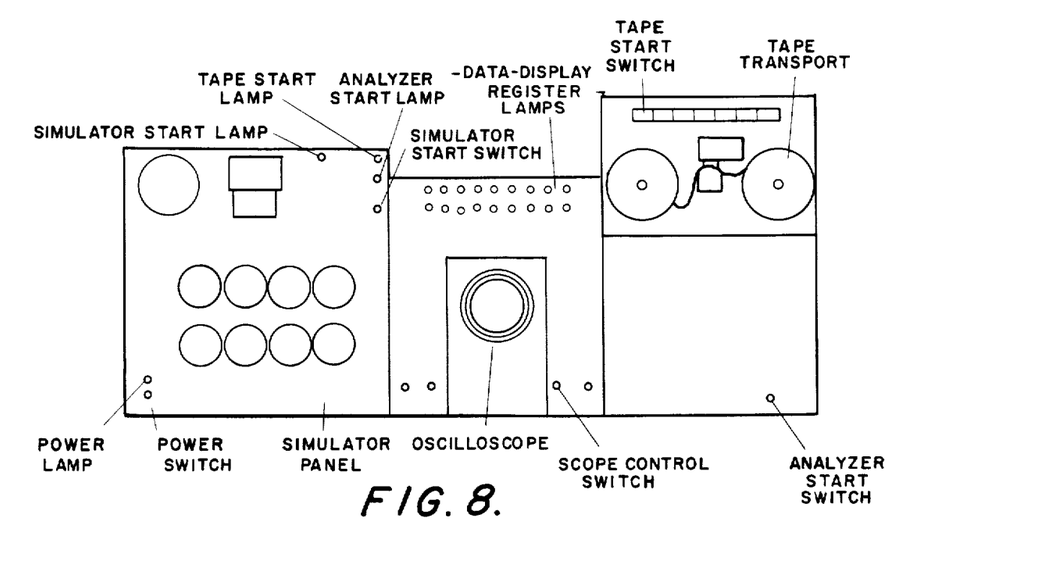
FIG. 8 is an example of a highly verbal - related pictorial instruction format.

IV. HIGHLY VERBAL - RELATED PICTORIAL — This group received primarily a verbal mode of presentation. Printed word instructions and word names were used to identify specific areas, objects, positions. A general picture with word-arrow locators were used to provide location information.

Obviously, many modifications and variations of the present invention are possible in light of the above teachings. It is therefore to be understood that, within the scope of the appended claims, the invention may be practiced otherwise than as specifically described.

TABLE I

TYPE AND QUANTITY OF CONTROL-DISPLAY ITEMS

| Control/Display Panel | Item | Number |
|---|---|---|
| | Signal Lamps | 11 |
| | Moving Pointer Dials | 2 |
| | Pushbutton Lamp/Switches | 42 |
| SIMULATOR | Rotary Dials | 15 |
| | Rotary Switches | 2 |
| | Toggle Switches 2 and 3 Position | 9 |
| | Pushbutton Switches | 2 |
| | Input Jacks | 18 |
| | Signal Lamps | 35 |
| DISPLAY | Oscilloscope (8 wave forms) | 1 |
| MONITOR | Meters | 8 |
| | Pushbutton Switches | 2 |
| | Signal Lamp | 1 |
| | Pushbutton Lamp/Switch | 9 |
| ANALYZER | Keyboard Switches | 107 |
| | Flip Switch | 1 |
| | Input Jacks | 64 |
| | Pushbutton Lamp/Switch | 9 |
| TAPE TRANSPORT | Tape Reels | 2 |
| | Input Jacks | 3 |

TABLE II

DIODE MATRIX INDEX FOR LAMPS, METERS, AND WAVEFORM DISPLAYS

| | Display | Matrix Column |
|---|---|---|
| | Top Row | |
| | 8 | 1 |
| | 7 | 2 |
| | 6 | 3 |
| | 5 | 4 |
| | 4 | 5 |
| | 3 | 6 |
| | 2 | 7 |
| | 1 | 8 |
| | $S_B$ | 9 |
| | $A_x$ | 10 |
| | Middle Row | |
| | 9 | 11 |
| | 8 | 12 |
| | 7 | 13 |
| | 6 | 14 |
| LAMPS | 5 | 15 |
| | 4 | 16 |
| | 3 | 17 |
| | 2 | 18 |
| | 1 | 19 |
| | $S_t$ | 20 |
| | M | 21 |
| | Bottom Row | |
| | Z | 22 |
| | Y | 23 |
| | X | 24 |
| | S | 25 |
| | M | 26 |

TABLE II-Continued

DIODE MATRIX INDEX FOR LAMPS, METERS, AND WAVEFORM DISPLAYS

|  | Display | Matrix Column |
|---|---|---|
|  | R | 27 |
|  | D | 28 |
|  | I | 29 |
|  | A | 30 |
|  | K | 31 |
|  | T | 32 |
|  | Red Fail | 33 |
|  | Green GO | 34 |
|  | CMPTR Fail | 45 |
|  | Main Power | 46 |
|  | Auxilliary Power | 47 |
| METERS | DC Microamps | 48 |
|  | DC Regulator | 49 |
|  | Impedance | 50 |
|  | DC Volts | 51 |
|  | Half Amp — Sine Wave | 53 |
|  | Full Amp — Sine Wave | 54 |
|  | Half Amp Half Sine | 55 |
| SCOPE | Full Amp Half Sine | 56 |
| SIGNALS | Half Amp saw tooth | 57 |
|  | Full Amp saw tooth | 58 |
|  | Half Amp Square Wave | 59 |
|  | Full Amp Square Wave | 60 |

What is claimed is:

1. A psychomotor task simulator to measure the relative effectiveness of different presentation techniques comprising:
   an array of controls and displays arranged to give a sense of reality to a test subject such that the setting is readily generalizable to actual man-machine interface situations;
   diode matrix means connected to said array for energizing the controls and displays in a plurality of selective manners in order to allow the programming of a plurality of consecutive tasks;
   subject control means for making a response in accordance with a set of instructions and for altering the diode matrix connections so that said array of controls and displays are energized in a different one of said plurality of selective manners of energization so that a different task may be performed;
   experimenter controls for altering the diode matrix connections in the same manner as said subject controls and including means for preventing the subject from changing the diode matrix connections if desired.

2. A psychomotor task simulator as in claim 1 wherein said subject control means comprises a GO and a FAIL switch both of which will advance said logic means to the next task.

3. A psychomotor task simulator as in claim 1 wherein said experimenter control means comprises a GO switch to advance said logic means to the next task and a RESET switch to reset said logic means when all the programmed tasks have been performed by the subject.

4. A psychomotor task simulator as in claim 1 further comprising an event recorder means to record the particular responses that the subject makes during each task and the times of said responses.

5. A psychomotor task simulator as in claim 1 wherein said diode matrix means comprises:
   counter means connected to said subject control means and to said experimenter control means;
   shift register means connected to said counter means;
   a diode matrix connected to said shift register means on one side and to said array of controls and displays on the other side of said diode matrix means so that on each count of said counter means a new row of diodes of said diode matrix means is energized.

6. A psychomotor task simulator as in claim 1 wherein said array of controls and displays comprises a plurality of lamps, meters, a tape recorder, and an oscilloscope means, each individually connected to a different column of said diode matrix means.

7. A psychomotor task simulator as in claim 6 wherein said oscilloscope means further comprises:
   signal generator means for generating a plurality of different shaped waveforms;
   gate means connected to said diode matrix, to said signal generator means, and to said oscilloscope means such that each different waveform generated by said signal generator means is connected to a different one of the columns of said diode matrix.

* * * * *